United States Patent
Shahar et al.

(10) Patent No.: US 9,261,609 B2
(45) Date of Patent: Feb. 16, 2016

(54) APPARATUS AND METHODS FOR CHARGE COLLECTION CONTROL IN RADIATION DETECTORS

(75) Inventors: Arie Shahar, Moshav Magshimim (IL); Eliezer Traub, Ramat-Gan (IL); Yaron Glazer, Rehovot (IL); Ira Micah Blevis, Haifa (IL)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 13/589,853

(22) Filed: Aug. 20, 2012

(65) Prior Publication Data

US 2014/0048714 A1 Feb. 20, 2014

(51) Int. Cl.
*G01T 1/24* (2006.01)

(52) U.S. Cl.
CPC ............... *G01T 1/241* (2013.01); *G01T 1/247* (2013.01)

(58) Field of Classification Search
CPC ....... G01T 1/241; G01T 1/2928; G01T 1/247; G01T 1/24; H01L 27/14659; H01L 27/14676
USPC ............... 250/370.08, 370.01, 370.09, 370.1, 250/371; 378/19; 257/428
See application file for complete search history.

(56) References Cited

U.S. PATENT DOCUMENTS

| | | | | |
|---|---|---|---|---|
| 2,824,974 A * | 2/1958 | Parsons | | 250/207 |
| 4,564,816 A * | 1/1986 | Kumar et al. | | 330/149 |
| 4,801,803 A | 1/1989 | Denen et al. | | |
| 4,885,620 A * | 12/1989 | Kemmer et al. | | 257/428 |
| 5,237,197 A * | 8/1993 | Snoeys et al. | | 257/458 |
| 5,355,013 A * | 10/1994 | Parker | | 257/458 |
| 5,396,072 A * | 3/1995 | Schiebel et al. | | 250/370.09 |
| 5,677,539 A * | 10/1997 | Apotovsky et al. | | 250/370.13 |
| 5,812,191 A | 9/1998 | Orava et al. | | |
| 6,034,373 A * | 3/2000 | Shahar et al. | | 250/370.01 |
| 6,046,454 A | 4/2000 | Lingren et al. | | |
| 6,218,668 B1 * | 4/2001 | Luke | | 250/370.01 |
| 6,333,504 B1 | 12/2001 | Lingren et al. | | |
| 6,399,950 B1 * | 6/2002 | Kimura et al. | | 250/370.09 |
| 6,608,311 B1 * | 8/2003 | Roziere et al. | | 250/370.09 |
| 6,765,213 B2 * | 7/2004 | Shahar et al. | | 250/370.09 |
| 6,856,350 B2 | 2/2005 | Orava et al. | | |
| 7,034,312 B2 * | 4/2006 | Sato et al. | | 250/370.09 |
| 7,139,367 B1 | 11/2006 | Le | | |
| 7,141,797 B2 * | 11/2006 | Yokoi et al. | | 250/370.1 |

(Continued)

OTHER PUBLICATIONS

Bolotnikov et al., "Charge loss between contacts of CdZnTe pixel detectors", 1999, Nuclear Instruments and Methods in Physics Research A, Elsevier, vol. 432 issues 2-3, pp. 326-331.*

*Primary Examiner* — David Porta
*Assistant Examiner* — Blake Riddick
(74) *Attorney, Agent, or Firm* — Dean D. Small; The Small Patent Law Group, LLC

(57) ABSTRACT

Apparatus and methods for charge collection control in radiation detectors are provided. One radiation detector includes a semiconductor substrate, at least one cathode on a surface of the semiconductor substrate, and a plurality of anodes on a surface of the semiconductor substrate opposite the at least one cathode, wherein the plurality of anodes have gaps therebetween. The radiation detector further includes a charge collection control arrangement configured to cause one or more charges induced within the semiconductor substrate by incident photons to drift towards one or more of the plurality of anodes.

24 Claims, 7 Drawing Sheets

(56) References Cited

U.S. PATENT DOCUMENTS

| | | |
|---|---|---|
| 7,361,881 B2 * | 4/2008 | Spartiotis .................. 250/214 L |
| 7,525,098 B2 * | 4/2009 | El-Hanany et al. ........ 250/370.1 |
| 7,652,258 B2 * | 1/2010 | Shahar et al. ............ 250/370.01 |
| 7,917,192 B2 | 3/2011 | Dos Santos Varela |
| 8,169,522 B2 | 5/2012 | Orava et al. |
| 8,350,221 B2 * | 1/2013 | Steadman Booker et al. ....................... 250/363.04 |
| 2001/0001562 A1 | 5/2001 | Orava et al. |
| 2001/0002844 A1 | 6/2001 | Orava et al. |
| 2002/0036269 A1 * | 3/2002 | Shahar et al. .............. 250/370.1 |
| 2002/0079456 A1 * | 6/2002 | Lingren et al. ........... 250/370.01 |
| 2002/0089595 A1 | 7/2002 | Orava et al. |
| 2003/0164888 A1 | 9/2003 | Orava et al. |
| 2003/0173522 A1 | 9/2003 | Spartiotis |
| 2011/0297838 A1 | 12/2011 | Wangerin et al. |
| 2012/0153173 A1 | 6/2012 | Chang et al. |

* cited by examiner

APPARATUS AND METHODS FOR CHARGE COLLECTION CONTROL IN RADIATION DETECTORS

BACKGROUND OF THE INVENTION

The subject matter described herein relates generally to pixelated radiation detectors, and more particularly to pixelated radiation detectors for nuclear medical (NM) imaging, such as a radiation camera head for Single Photon Emission Computed Tomography (SPECT), Computed Tomography (CT) and/or Positron Emission Tomography (PET).

In direct conversion detectors, such as semiconductor radiation detectors, the interaction of the incident photons with the semiconductor from which the detector is made produces a cloud of charge-carriers including electron-holes pairs. The electrons drift toward the positively biased pixelated anodes and the holes drift toward the negatively biased cathode. The efficiency of the charge collection by the pixelated anodes depends upon the geometrical structure of the detector and the physical properties of the semiconductor bulk from which the detector is made, among other factors. Additionally, factors not related to the physical properties of the semiconductor bulk, such as lifetime and mobility that affect the detector incomplete charge collection, are the charge sharing between adjacent anodes and the surface recombination in the gap between the anodes.

At least one known method to improve the charge collection is to sum the signal of adjacent pixels in which the signals appear simultaneously. However, the summing method does not solve the problem of the electrons surface-recombination in the gaps between the anodes and also does not recover a large fraction of the shared events that have signals which are below the electronic threshold level. Additionally, the fraction of the shared events that the summing process can account for are reconstructed while increasing the noise (energy resolution).

BRIEF DESCRIPTION OF THE INVENTION

In one embodiment, a radiation detector is provided that includes a semiconductor substrate, at least one cathode on a surface of the semiconductor substrate, and a plurality of anodes on a surface of the semiconductor substrate opposite the at least one cathode, wherein the plurality of anodes have gaps therebetween. The radiation detector further includes a charge collection control arrangement configured to cause one or more charges induced within the semiconductor substrate by incident photons to drift towards one or more of the plurality of anodes.

In another embodiment, a radiation detector is provided that includes a semiconductor substrate, at least one cathode on a surface of the semiconductor substrate, and a plurality of anodes on a surface of the semiconductor substrate opposite the at least one cathode, wherein the plurality of anodes have gaps therebetween. The radiation detector further includes a charge collection control arrangement having a plurality of switches and resistors forming a voltage divider to bias the plurality of anodes, and further having a control unit to control the switching of the switches to shift a charge sharing line within the semiconductor substrate to cause one or more charges induced within the semiconductor substrate by incident photons to drift towards one or more of the plurality of anodes.

In yet another embodiment, a method for controlling charge collection in a pixelated radiation detector is provided. The method includes coupling a charge control arrangement to a pixelated radiation detector and controlling charge collection of the pixelated radiation detector with the charge control arrangement using a plurality of switches and resistors forming a voltage divider to bias a plurality of anodes of the pixelated radiation detector by controlling the switching of the switches to shift a charge sharing line within a semiconductor substrate of the pixelated radiation detector to cause one or more charges induced within the semiconductor substrate by incident photons to drift towards one or more of the plurality of anodes.

DETAILED DESCRIPTION OF THE INVENTION

Figure 1:
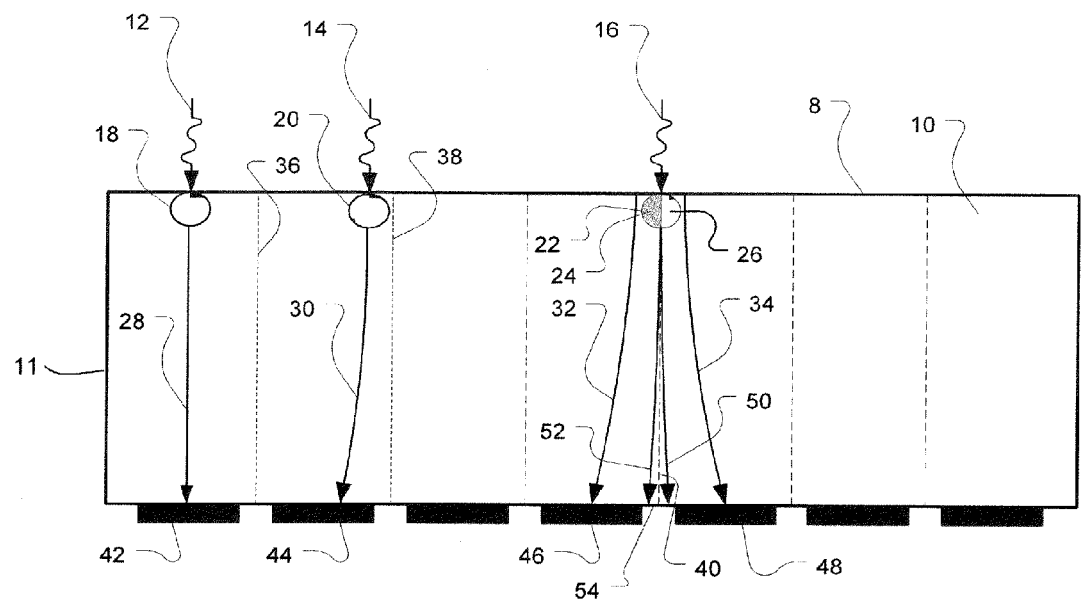
FIG. 1 is a schematic diagram of a detector in connection with which various embodiments may be implemented.

The following detailed description of various embodiments will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although various embodiments may be described with respect to detectors for a particular imaging system or type of imaging to be performed, the various embodiments may be implemented in connection with different types of imaging modalities, such as, Computed Tomography (CT) imaging, Positron Emission Tomography (PET) imaging, and Single Photon Emission Computed Tomography (SPECT) imaging, among others.

Various embodiments provide apparatus and methods for controlling charge collection in pixelated radiation detectors. At least one technical effect of various embodiments is reducing or eliminating surface recombination of electrons in the gaps between the anodes of a pixelated detector. At least another technical effect of various embodiments is the recovery of all the shared events including events having a signal level that is below an electronics threshold level. At least another technical effect of various embodiments is the recovery of shared events with an energy resolution that is similar to the energy resolution of non-shared events. At least another technical effect of various embodiments is improved sensitivity of the detector, thereby allowing the use of multiple isotopes (low energy tail) and/or yield improvement in the manufacturing of the detectors.

FIG. 1 schematically illustrates a detector 10 formed from a semiconductor substrate 11 while collecting charges 18, 20 and 22 produced in the detector 10 by incident photons 12, 14, and 16, respectively. The charges 18 and 20 are completely collected by the anodes 42 and 44 along lines 28 and 30, respectively. The charge 22 includes charge collection starting along the border line 40 between the anodes 46 and 48, which is the charge sharing line between the anodes 46 and 48 along which the trajectory of the electrical field between anodes 46 and 48 is aligned. Charge, such as, charge 22 includes the charges 24 and 26 on both sides of the line 40. The collection of charges, such as, charge 22 is shared between the anodes 46 and 48 when the anode 46 collects the charge 24 along lines such as lines 50 or 34 and the anode 48 collects the charge 26 along lines such as lines 52 or 32. The detector 10 includes a cathode contact 8 to produce electrical field in a substrate 11 by applying a bias voltage between the cathode 8 and anodes, such as, the anodes 42, 44, 46 and 48. The border line 36 between the anodes 42 and 44 and the border line 38 near the anode 44 are similar to the border line 40 between the anodes 46 and 48.

Figure 2:
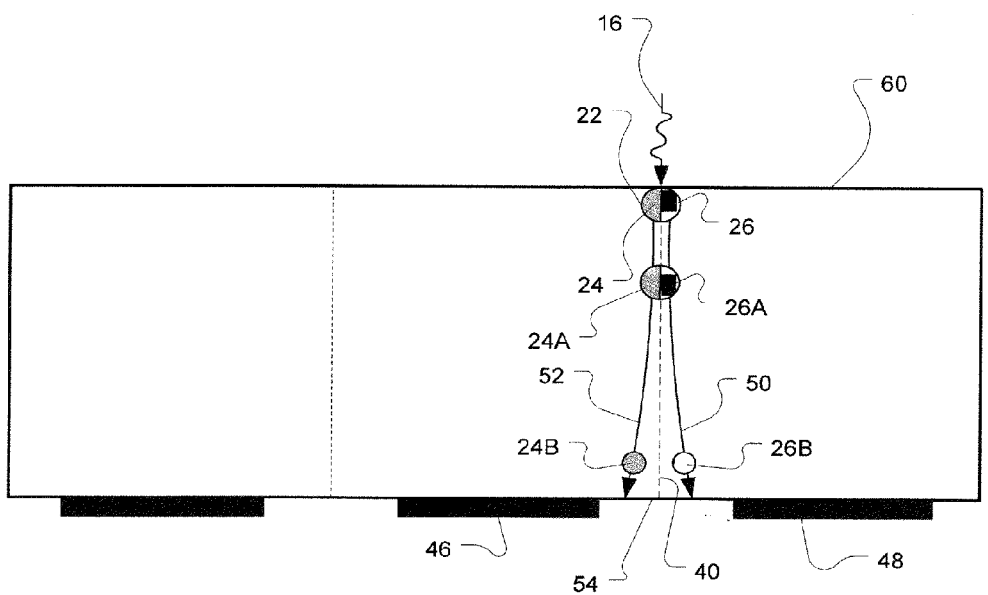
FIG. 2 is a schematic diagram of a portion of a detector illustrating charge sharing and surface recombination in the gap between anodes.

FIG. 2 is a schematic illustration of a detector 60 showing a magnified portion similar to a portion of the detector 10 of FIG. 1. However, it should be noted that the proportions between the parts of FIGS. 1 and 2 are not necessarily maintained. FIG. 2 shows the charge sharing of the charge 22 between the anodes 46 and 48. The charges 24 and 26 (included in charge 22) drift along electrical field-lines 52 and 50 as the charges 24A and 25A, respectively. The charges 24A and 26A arrive at a gap 54 along the lines 52 and 50 as charges 24B and 26B, respectively. At the gap 54 between the anodes 46 and 48, the charges 24B and 26B may suffer from or experience surface recombination prior to charge collection by the anodes 46 and 48, respectively.

The charge loss at the gap 54 causes incomplete charge collection. This charge loss cannot be recovered, including when a summing method is applied. Accordingly, in a situation when surface recombination exists in the gap 54 between the anodes 46 and 48, the charge sharing of the charge 22 cannot be recovered by the summing method.

Figure 3:
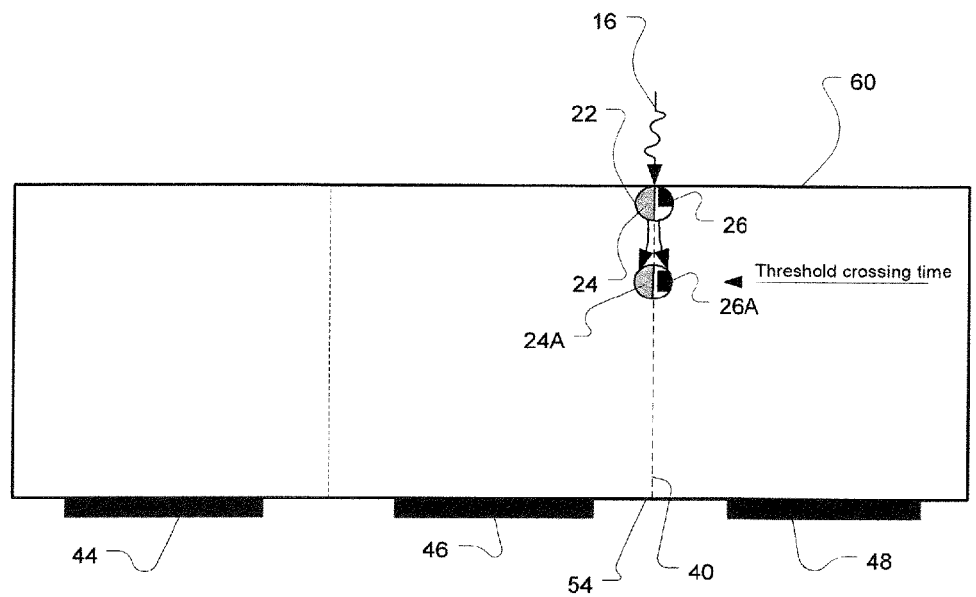
FIG. 3 is another schematic diagram of a portion of a detector illustrating charge sharing.

FIG. 3 is a schematic illustration of the detector 60 of FIG. 2 (corresponding to FIG. 1) showing the drift of the charges 24 and 26 (of the charge 22) along the electrical field-lines 50 and 52 (shown in FIG. 2) to the point that that charges 24 and 26 induce a charge in adjacent anodes 46 and 48 that is sufficient to produce simultaneous signals that exceed the electronic threshold levels in the electronic channels electrically coupled to the anodes 46 and 48. During the drift of the charges 24 and 26 shown in FIG. 3, the bias voltage on the anodes 44, 46 and 48 is equal to V.

Figure 4:
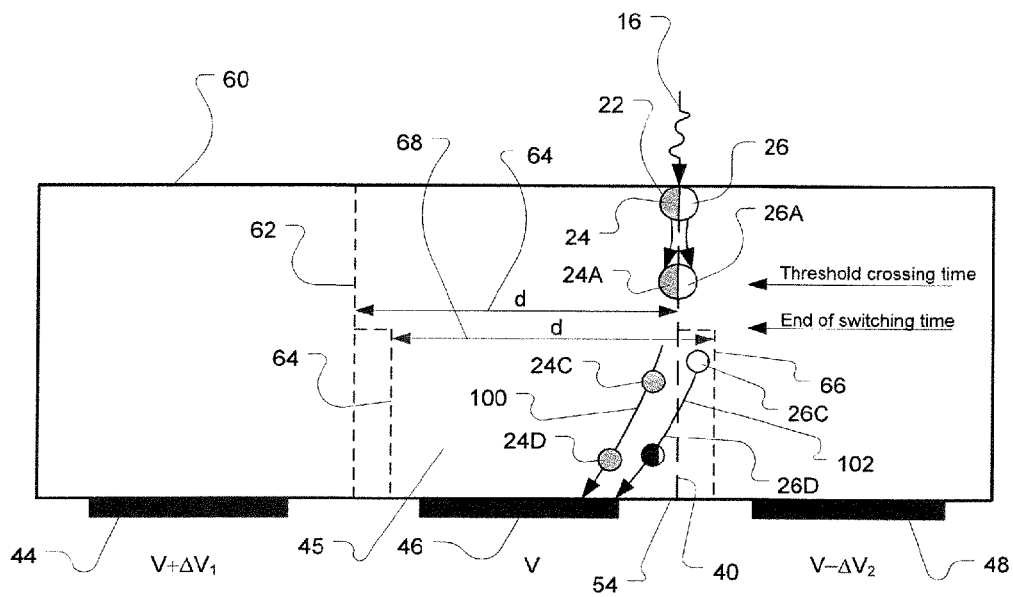
FIG. 4 a schematic diagram of a portion of a detector illustrating charge collection control in accordance with various embodiments.

FIG. 4 schematically illustrates high voltage switching on the anodes 44, 46 and 48 that may be controlled, for example, with a charge collection control arrangement 101 (shown in FIGS. 5 and 6 and also referred to as a control unit 101) and in response to simultaneous signals that exceed the electronic threshold level in two electronics channels, such as electronic channels coupled to adjacent anodes 46 and 48. For example, after the high voltage switching, the bias voltage on the anodes 44, 46 and 48 is $(V+\Delta V_1)$, V and $(V-\Delta V_2)$, respectively.

The high voltage switching shifts the charge sharing lines from the lines 62 and 40 prior to the high voltage switching, to the lines 64 and 66 after the high voltage switching. The shift of the sharing lines shifts the position of the voxel 45 that includes the anodes 46 to contain the charges 24C and 26C. Accordingly, the charges 24C and 26C, corresponding to charges the 24B and 26B of FIG. 2, are collected along lines 100 and 102, as charges 24D and 26D, by the anode 46. The shift of the voxel 45 does not change the area and volume thereof because the width prior to and after the high voltage switching is the same and is equal to d. The positions of the width d prior and post the shift of voxel 45 are indicated by referral numerals 64 and 68, respectively.

The shift of the voxel 45 is large enough to include the charges 24C and 26C relatively deep in the volume of the voxel 45 in order to cause both charges 24C and 26C to drift directly towards the anode 46, as charges 24D and 26D, respectively, without reaching the gap 54 where these charges might suffer from surface recombination causing incomplete charge collection. Thus, according to various embodiments, a summing method is not used, and the charge collection is complete as long as the electrical signal induced by charge 22 is above the electronic threshold and even if one of charges 24C or 26C produces an electrical signal below the electronic threshold. The charge collection also does not suffer from surface recombination at the gap 54. Since both charges 24C and 26C are completely collected, as charges 24D and 26D, respectively, by anode 46, there is no degradation in the energy resolution of the detector due to the charge-collection control. This is unlike the case where the problem of charge sharing is addressed by summing the signals from adjacent anodes in which the nose increases by a factor of $(2)^{1/2}$ and thus the energy resolution deteriorates by the same factor.

The values of $+\Delta V_1$ and $-\Delta V_2$ have been derived experimentally to be around +/-50V. For example, described below is a determination of the difference between the bias voltages of adjacent pixels to shift the charge sharing line by 200 μm. In particular, lowering the relative voltage on surrounding pixels shifts the charge-sharing line and enhances the total charge collection of the center pixel.

For example, to determine the shift, the relative voltage of the surrounding pixels may be lowered by connecting all of the surrounding pixels to ground through a resistor to be used as a voltage divider. The total resistance measured to the connected surrounding pixels in one embodiment was 450MΩ, wherein a 0, 13.3, 26.6 and 40MΩ resistors are used for the voltage divider. The applied bias voltage on the surrounding pixels is correspondingly −600, −582.78, −566.51 and 551.13V (i.e. $\Delta V=0$, −17.22, −33.49 and −48.87).

Using a wafer tester equipped with two radioactive sources, $Am^{241}$ for energy calibration and $Co^{57}$ for energy distribution measurements, measurements may be performed on the modified wafer as described above. During the measurement process in one embodiment the $Am^{241}$ provides the energy peak for calibration and the Co57 measurement is then sequentially started. The difference between measurements is the total number of events collected in a time frame of 90 seconds. In one embodiment, the total number of events that were measured was T1=8.20e+3, T2=9.55e+3, T3=11.00e+ 3, and T4=11.60e+3 (events per 90 sec). As the total events are in direct proportion with the total voxel area, the pixel pitch may be defined as:

$$P_{2/3/4} = P_1 \cdot \sqrt{T_{2/3/4}/T_1} = 2.65, 235, 2.93 \text{ [mm]}$$

where P1 is the physical pixel pitch (2.46 mm).

Thus, with a different bias voltage of approximately 50V, a shift of the charge-sharing line may be obtained as follows:

$$\frac{\Delta P}{2} = \frac{2930 - 2460}{2} = 230 \mu m.$$

As another example, direct charge-sharing line measurements may be performed on a two-pixel scan-test bench. The scan-test includes irradiating the detector with small radiation spots along a path between adjacent anodes performed with small scan-steps and measuring, for each scan-step, the energy of the peak in the anode spectrum (the energy-peak of the energy distribution of the events measured by each anode). The position of a border or charge sharing line is the position where the peak position of the spectra of the adjacent anodes is in the same energy. In this example, a pinhole collimated radiation source may be used to evaluate the exact charge-sharing line. The measurement precision in some embodiments is up to 15 µm.

The two pixel scan may be used to evaluate the street quality between adjacent anodes and the charge sharing line. Making a small change in the system, a voltage drop between the two measured pixels (anodes) may be obtained. For example, to change the relative voltage between two neighbor pixels a bleeding resistor on one of the pixels may be changed. In one embodiment, bleeding resistors of 10 GΩ, 7.14 GΩ, 3.33 GΩ and 2.5 GΩ may be used, with a corresponding voltage drop of 0V 49.6V, 160V, and 196.5V.

In one embodiment, the two pixel scan test bench uses an $Am^{241}$ source that is collimated with a 170 µm pinhole. The collimated pinhole radiation is then moved from one pixel to the near pixel in a stepwise sequence of 30 µm. In each step, an energy distribution measurement is performed with a 240 second window. The peak position and total charge collection are then calculated.

With the 3.33 GΩ and 10 GΩ, bleeding resistors, the charge share line moves by 260 µm with a 160V drop between pixels. With the 2.5 GΩ bleeding resistors i.e. 196.5V drop between pixels results in a 265 µm share line movement, and with the 7.14 GΩ resistor and a 49.6V drop, results in a 180 µm movement.

Thus, if the street is 600 µm and at 169 voltage drop, a 265 µm charge share line is at about the highest shift. The shift of the sharing line is about 200 µm, which is achieved by ΔV of 48V or 60V according to examples above, respectively.

Referring again to FIG. 4, because the voxel 45 does not change the area thereof, the leakage current at the anode 46 does not change as well. In addition, the leakage current between the anodes 44 and 46 having a bias voltage difference of $+\Delta V_1$ is compensated by the leakage current between the anodes 46 and 48 having a bias voltage difference of $-\Delta V_2$.

Additionally, the anodes 44, 46 and 48 are blocking contacts and, thus, the leakage current between the anodes is very small.

For example, the calculations of the noise induced to the measured pixel by the high voltage switching in the neighbor pixels are described below. As described below, the noise is negligible in various embodiments (and far below the noise of the summing method).

In particular, the known parameters include the following:
1. Pixels pitch: P=2.4 mm
2. Detector leakage current @ 600V: $I_L$=10 nA
3. Drift time after the switching: $T_D$=300 ns
4. Switching time: $T_S$=10 ns
5. Change of bias voltage: ΔV=80V
6. Leakage current between anodes @ 80V: $I_A$=0.02 nA
7. Shift distance of the Voxel: X=200 µm
8. Pair production energy: $E_P$=4 eV
9. Isotope Energy: $E_I$=122 Kev The area of the shifted pixel is reduced on one side by the following amount:

$$A = P \cdot X = 0.2 \cdot 2.4 = 0.48 \text{ mm}^2 \quad \text{Eq. (B1)}$$

On the other side, the area of the shifted pixel is reduced by the same amount. Under perfect conditions, there will be no change in the area of the shifted pixel and thus the leakage current will not change as well. Under imperfect conditions, the difference between the areas on both sides of the shifted (measured) pixel may be 10% of the area in Eq. B1.

Accordingly, the area change ΔA of the shifted pixel may be:

$$\Delta A = 0.1 \cdot A = 0.1 \cdot 0.2 \cdot 2.4 = 0.1 \cdot 0.48 = 0.048 \text{ mm}^2 \quad \text{Eq. (B2)}$$

The pixel area $A_D$ is:

$$A_D = 2.4 \cdot 2.4 = 5.76 \text{ mm}^2 \quad \text{Eq. (B3)}$$

The change in the leakage current $\Delta I_L$ due to the area change ΔA of the shifted voxel is:

$$\Delta I_L = \frac{\Delta A}{A_D} \cdot I_L = \frac{0.048}{5.76} \cdot 10 \text{nA} = 0.08 \text{nA} \quad \text{Eq. (B4)}$$

This current induces charge $Q_1$ in the anodes for the time of the drift $T_D$=300 ns. $Q_1$ is given by:

$$Q_1 = \Delta I_L \cdot T_D = 0.08 \cdot 10^{-9} \cdot 300 \cdot 10^{-9} = 2.4 \cdot 10^{-17} C \quad \text{Eq. (B5)}$$

The leakage current $I_A$=0.02 nA between adjacent anodes is directed in opposite directions between the measured anode and adjacent anodes. Accordingly, under perfect conditions this current is nulled. Under imperfect conditions, this current $\Delta I_A$ may be 10% of $I_A$ and is equal to:

$$\Delta I_A = 0.1 \cdot I_A = 0.002 \cdot 10^{-9} = 2 \text{ pA} \quad \text{Eq. (B6)}$$

This current induces charge $Q_2$ in the measured anode for the time of the drift $T_D$=300 ns. $Q_2$ is given by:

$$Q_2 = \Delta I_A \cdot T_D = 2 \cdot 10^{-12} \cdot 300 \cdot 10^{-9} = 6 \cdot 10^{-19} C \quad \text{Eq. (B7)}$$

If there is a delay between the switching times on both sides of the measured voxel, the leakage current change during this delay is:

$$\Delta I_L = \frac{A}{A_D} \cdot I_L = \frac{0.48}{5.76} \cdot 10 = 0.8 \text{nA} \quad \text{Eq. (B8)}$$

The delay $\Delta T_s$ of the switching time $T_s$ may be 10% of the switching time and is equal to 1 ns.

The charge $Q_3$ induced by the current $\Delta I_L$ for the delay time $\Delta T_s$ is:

$$Q_3 = \Delta I_L \cdot \Delta T_S = 0.8 \cdot 10^{-9} \cdot 1 \cdot 10^{-9} = 8 \cdot 10^{-19} C \quad \text{Eq. (B9)}$$

The total noise charge $Q_N$ is:

$$Q_N = Q_1 + Q_2 + Q_3 = 2.4 \cdot 10^{-17} + 6 \cdot 10^{-19} + 8 \cdot 10^{-19} = 2.4 \cdot 10^{-17} C \quad \text{Eq. (B10)}$$

The charge $Q_s$ of the signal produced by the absorbed photon is equal to the number of pairs produced times the electron charge and is equal to:

$$Q_s = \frac{E_t}{E_P} \cdot e = \frac{122 \cdot 1 C^2}{4} = 3.0 \cdot 10^4 \cdot 1.6 \cdot 10^{-19} = 4.8 \cdot 10^{-15} C \quad \text{Eq. (B11)}$$

Accordingly:

$$\frac{Q_N}{Q_s} = \frac{2.4 \cdot 10^{-17}}{4.8 \cdot 10^{-15}} = 5 \cdot 10^{-2} \quad \text{Eq. (B12)}$$

The noise charge $Q_N$ may contribute to a peak shift of the total spectrum of the measured pixels. $Q_N$ exists only in shared events that are 14% of the total events. Accordingly, the peak shift of the total spectrum of spectrum broadening is equal to:

$$\frac{Q_N \cdot 0.14}{Q_s} = 5 \cdot 10^{-2} \cdot 0.14 = 7 \cdot 10^{-2} = 0.07\% \quad \text{Eq. (B13)}$$

This broadening of the spectrum in the amount of 0.07% is negligible.

Figure 5:
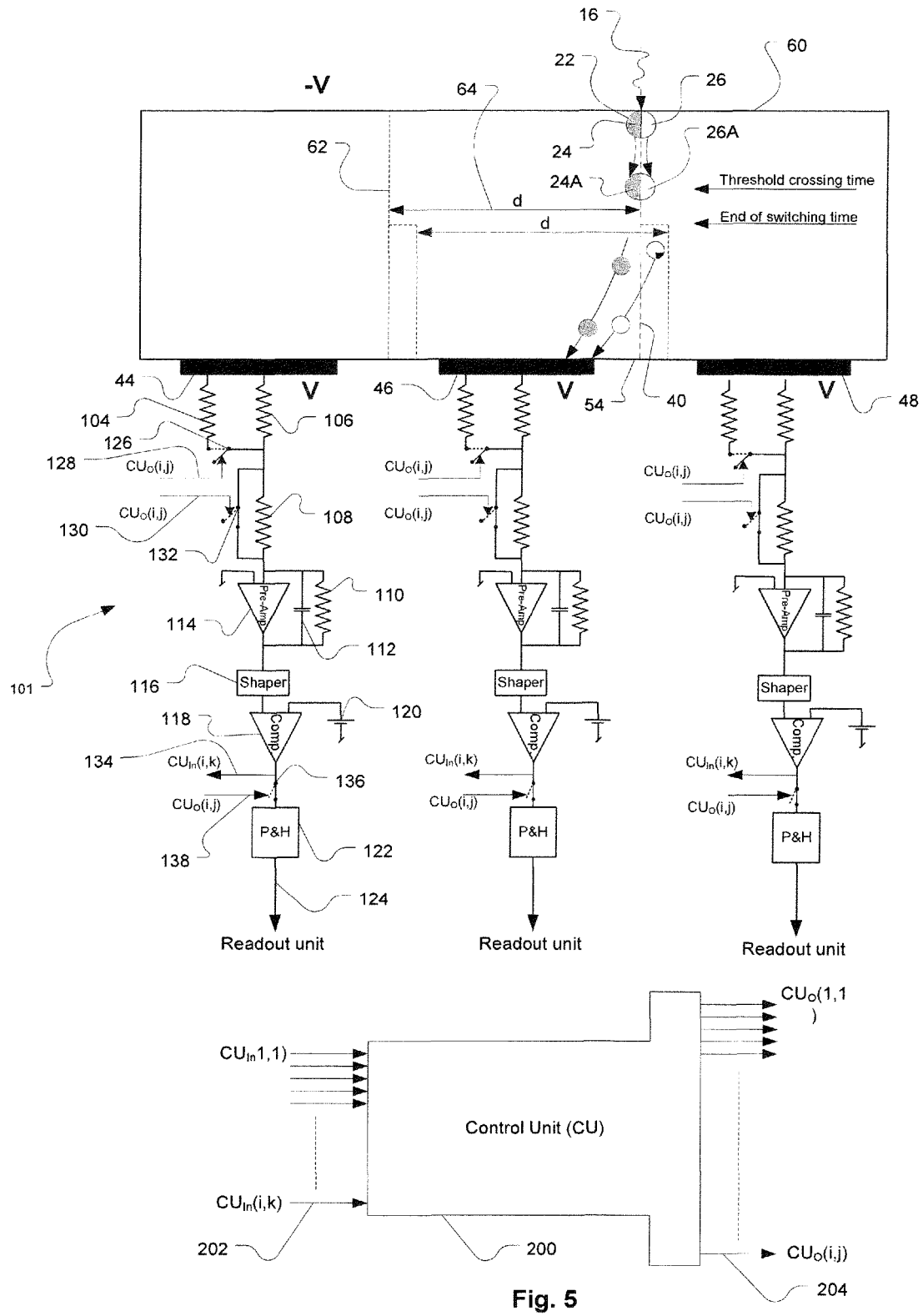
FIG. 5 is a diagram of a portion of a detector illustrating a charge collection control arrangement in accordance with an embodiment in one operating state.

Referring now to FIG. 5, which shows the detector 60 of FIG. 3 coupled to control unit 101 when the charge 22 does not produce electrical signals that exceed the electrical threshold levels, produced by reference biases 120, of a plurality of comparators 118 in the channels electrically coupled to the anodes 46 and 48. As can be seen in the embodiment of FIG. 5, the electronic channels are electrically coupled to the anodes 44, 46 and 48 and include resistors 104, 106 and 108 combined with switches 126 and 132. In operation, as long as the signal in the electronic channels of the anodes 46 and 48 do not exceed the threshold level of comparator 118, the switches 126 are in an open position and the switches 132 are in a closed position. In this configuration, the combination of the positions of the switches 126 and 132 and the resistors 104, 106 and 108 creates an equivalent resistance in series to the resistance of the detector 60 to create a voltage divider. The voltage divider biases the anodes 44, 46 and 48 by voltage V. It should be noted that a preamplifier 114 connected in parallel with a resistor 110 and capacitor 112, along with a signal shaper 116, are provided to condition the signal from the anodes 44, 46 and 48 that is received by the comparator 118.

In this configuration, the switches 136 are closed and all the electronic channels of the anodes 44, 46 and 48 are in an enabled position allowing the electrical signals from the electronic channels to arrive to the readout unit through a peak and hold (P&H) circuit 122 to be outputted via a port 124.

Additionally, a control unit 200 may be provided that receives signals from ports 134 of the comparators 118 into inputs 202 indicating which of the channels exceeds the threshold level of the comparators 118. As is described below in connection with FIG. 6, in a case that such signals are received simultaneously at the inputs 202 of the control unit 200, from two electronic channels belonging to two adjacent pixels, the control unit 200 generates signals at outputs 204 to control the switches 126, 132 and 136 via the ports 128, 130 and 138, respectively. It should be noted that reference numerals are shown for a single channel for simplicity and ease of illustration.

Figure 6:
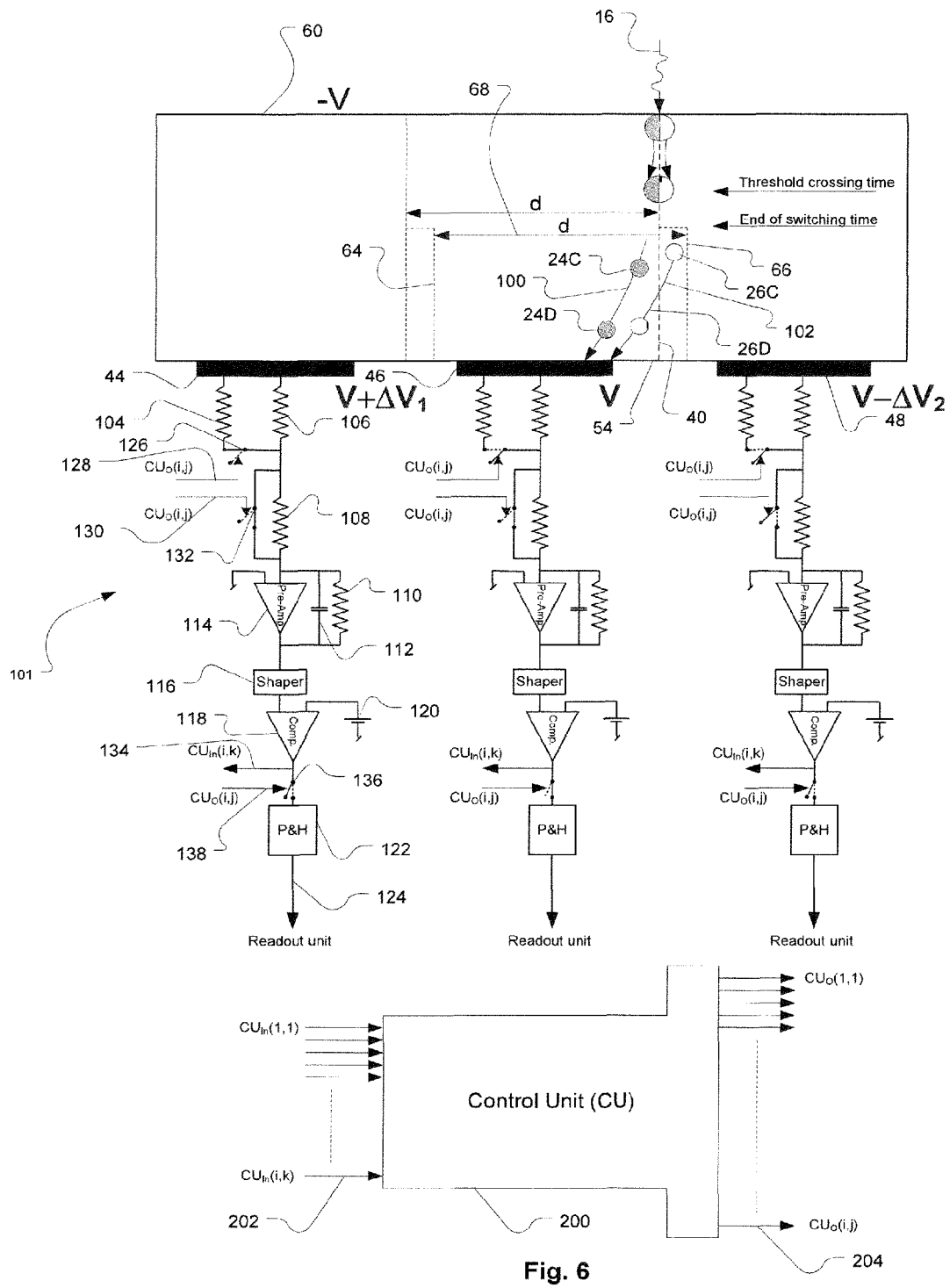
FIG. 6 is a diagram of a portion of a detector illustrating a charge collection control arrangement in accordance with an embodiment in another operating state.

FIG. 6 illustrates the detector 60 of FIG. 4 when the charge 22 produces electrical signals that simultaneously exceed the threshold levels of the comparators 118 in the channels electrically coupled to the anodes 46 and 48. FIG. 6 shows the same detector 60 and electronic channels illustrated by FIG. 5. FIG. 6 differs from FIG. 5 by the positions of the switches 126, 132 and 136. In this configuration, immediately after the charge 22 produces electrical signals that simultaneously exceed the threshold levels of the comparators 118 in the electronic channels electrically coupled to the anodes 46 and 48, the switching position of the switches 126, 132 and 136 are reconfigured or changed.

In particular, the reconfiguration is performed by the control unit 200 that generates control signals at the outputs 204 to control the switches 126, 132 and 136 via the ports 128, 130 and 138, respectively. The configuration of the switches 126, 132 and 136 may be performed by the control unit 200 is as follows:

1. The electronic channel coupled to the anode 46 (the signal anode) remains with no change in the configuration of the switches 126, 132 and 136 and thus the anode 46 remains with bias voltage V.
2. In the electronic channel coupled to the anode 44, the switch 126 moves from an open position to a closed position and the switch 132 remains closed. In this configuration, the equivalent resistance produced by the combination of the resistors 104, 106 and 108 combined with the switches 126 and 132 is lower than the equivalent resistance in the electronic channel of the anode 46. Since the cathode 8 (shown in FIG. 1) is biased negatively, the voltage divider in the electronic channel of the anode 44 biases the anodes 44 with a voltage that is more positive by the value $\Delta V_1$ than the bias voltage of the anode 46. The switch 136 moves from a closed position (enabled) to an open position (disabled) to disable the reading of the injected signal produced by the switching of the switches 126 and 132
3. In the electronic channel coupled to the anode 48, the switch 126 remains open and the switch 132 moves from a closed position into an open position. In this configuration, the equivalent resistance produced by the combination of the resistors 104, 106 and 108 combined with the switches 126 and 132 is higher than the equivalent resistance in the electronic channel of the anode 46. Since the cathode 8 (shown in FIG. 1) is biased negatively, the voltage divider in the electronic channel of the anode 48 biases the anodes 48 with a voltage that is more negative by the value $\Delta V_2$ than the bias voltage of the anode 46. The switch 136 moves from a closed position (enabled) to an open position (disabled) to disable the reading of the injected signal produced by the switching of the switches 126 and 132

The biasing of the anodes 44, 46 and 48 with biases $(V+\Delta V_1)$, $(V)$ and $(V-\Delta V_2)$ when V is negative and $\Delta V_1$ and $\Delta V_2$ are positive as shown in FIG. 6, produces the shift of the voxel 45 as illustrated by FIG. 4. As described above for FIG. 4, the shift of the voxel 45 reduces or eliminates the charge sharing and the surface recombination at the gap 54 between the anodes 46 and 48.

Figure 7:
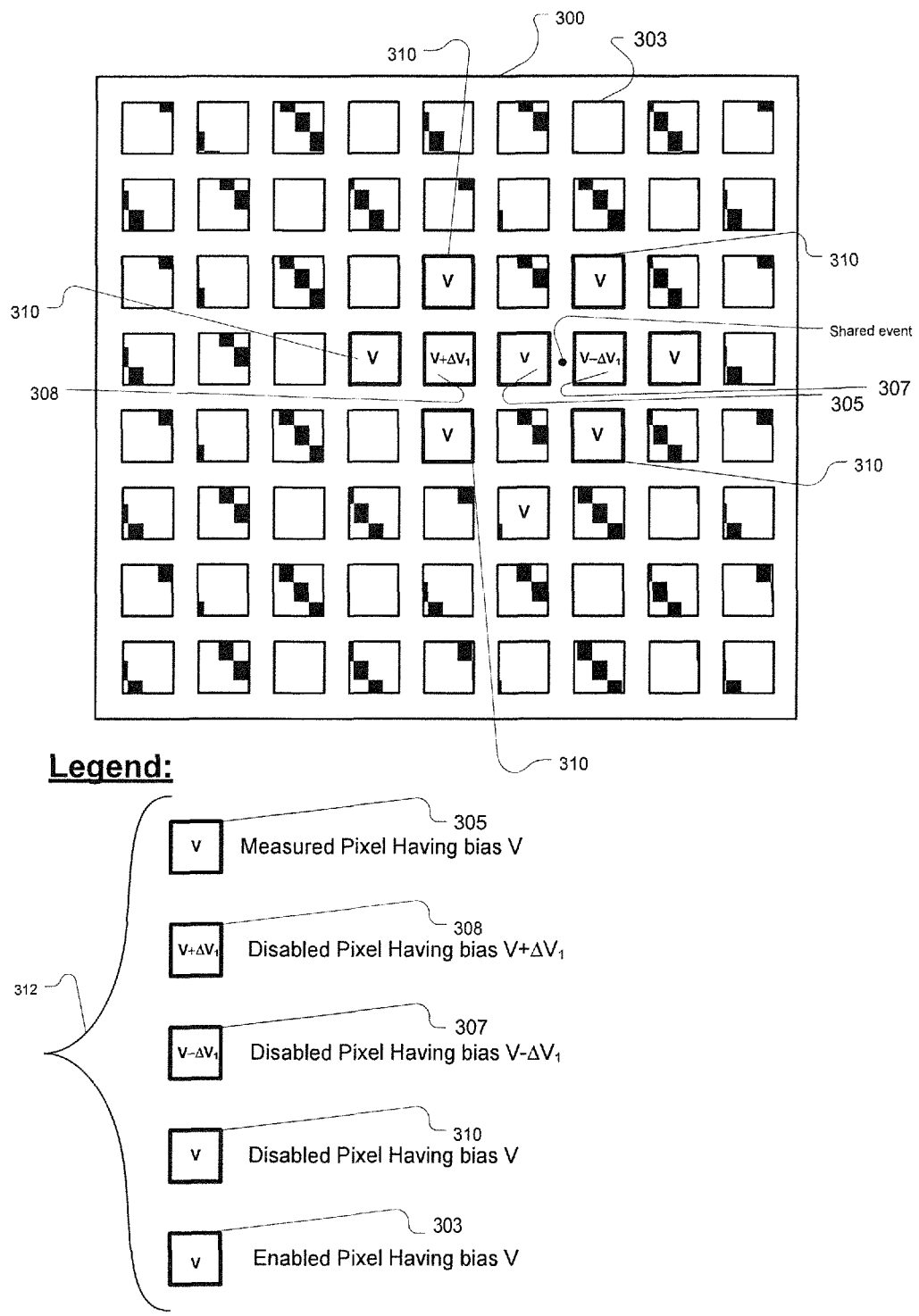
FIG. 7 is a top view of a detector controlled in accordance with various embodiments.

FIG. 7 schematically illustrates a top view of a detector 300 having anodes 303. The detector 300 is similar to the detector 60 and the anodes 303 (also referred to as pixels) are similar to the anodes 44, 46 and 48 of FIG. 6.

After the switching of the high voltage controlled by the control unit 200 of FIG. 6, all of the anodes 303 are biased the same with bias voltage V except for two pixels 308 and 307, which are biased by voltages (V+$\Delta V_1$) and (V−$\Delta V_2$), respectively. The pixels 307 and 308 are on both sides of pixel 305 which is the measured pixel. The pixels 307 and 308 and immediate neighbor pixels 310 may suffer from injection noise produced by the switching in the electronic channels of the pixels 307 and 308. Accordingly, the pixels 307, 308 and 310 are all in a disabled position. The Legend 312 describes the pixels 303, 305, 307, 308 and 310.

The disabled position of the pixels 307, 308 and 310 is for a very short time and in various embodiments is equal to the drift time in the detector after the charge 22 produces a signal that passes the threshold level. This time is about 300 ns in some embodiments and the number of disabled pixels during this time is 8 in various embodiments.

The calculation of the number of events lost due to the dead (disabling) time using a Poisson distribution, disabling time of 300 ns, count rate for pixel that is equal to 500 counts/(pixel-sec), 14% shared events out of the total number of events and 8 disabled pixels, is described below, and is negligible.

In particular, the probability to have more than one event in the 8 pixels during the dead time of the detector and the electronics is given by Poisson distribution as is shown below. In the first step, the probability to have in the 8 pixels no more than one event is calculated as follows:

$$P(0)+P(1)=e^{-\lambda}\cdot(1+\lambda)\approx(1-\lambda^2) \quad \text{Eq. (C1)}$$

where P(0) and P(1) are the probabilities to have zero and one events, respectively.

The probability for random-coincident is (the probability for more than one event in the 8 pixels which are produced by random coincidence and not by charge sharing):

$$1-(1-\lambda^2)=\lambda^2 \quad \text{Eq. (C2)}$$

The average photons rate for 8 pixels is:

$$R=500 \text{ cps}\cdot 8=4000 \text{ cps} \quad \text{Eq. (C3)}$$

A dead-time of $\tau_1$=300n results in:

$$\lambda=4\cdot 10^3 \cdot 300\cdot 10^{-9}=1.2\cdot 10^{-3} \quad \text{Eq. (C4)}$$

The probability for random-coincidence (events loss during the dead-time) is ($\lambda^2$) and is given by:

$$P(<2)=\lambda^2=(1.2\cdot 10^{-3})^2=1.44\cdot 10^{-6} \quad \text{Eq. (C5)}$$

The shared events are 14% out of the total events thus, the probability for events loss is:

$$P(<2)\cdot 14\cdot 10^{-2}=1.44\cdot 10^{-6}\cdot 14\cdot 10^{-2}=2.0\cdot 10^{-7} \quad \text{Eq. (C5)}$$

Thus, in various embodiments, the fraction of events loss out of the total events is negligible. Moreover, as described above, even though the pixels 307, 308 and 310 may suffer from injection noise, the measured pixel 30 does not suffer from such noise.

Figure 8:
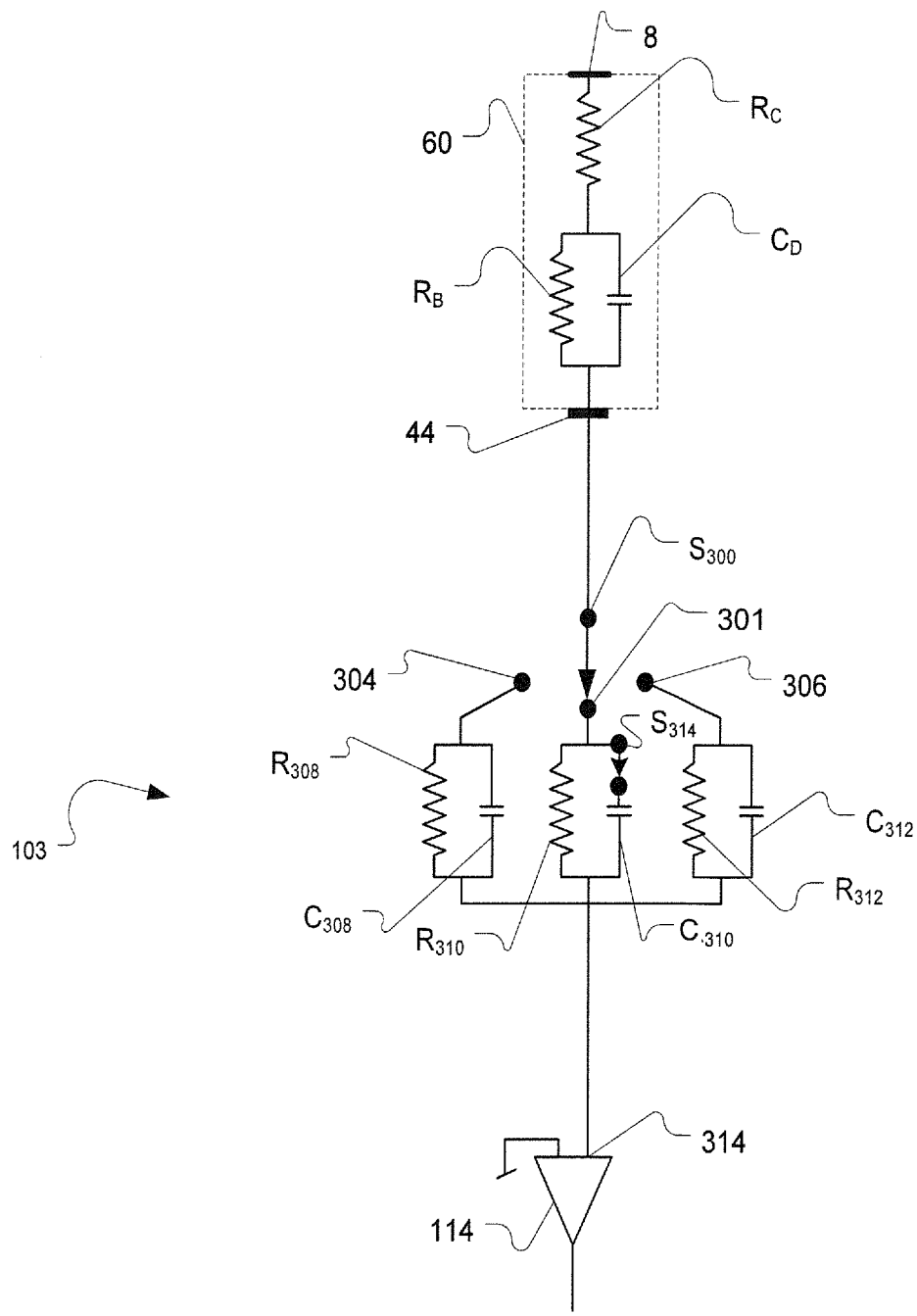
FIG. 8 is a schematic diagram of a portion of a detector illustrating a charge collection control arrangement in accordance with another embodiment.

FIG. 8 is another embodiment that is operable to allow fast changing of the bias on anodes, such as anodes 44, 46 and 48 of the detector 60. However, FIG. 8 provides fast switching of the bias by taking into account the parasitic capacitance $C_D$ of detector 60 (instead of only the switching principle of the bias-voltage to anode 44 as described in other embodiments).

FIG. 8 schematically illustrates detector 60 (shown by broken lines) with the equivalent electrical circuit thereof containing:

1. Contacts resistors $R_C$ representing the resistance of cathode 8 and anodes 44;
2. Bulk resistor $R_B$ representing the bulk resistance of the detector; and
3. Detector capacitance $C_D$ representing the parasite capacitance of the detector.

For the clarity of FIG. 8, reducing the density thereof and easing the understanding of the illustration, FIG. 8 schematically illustrates only the anode 44 of the detector 60 and only part of a single electronic channel that is coupled to anode 44.

A switch 300 having switching-positions 302, 304 and 307 is an alternative configuration to the configurations shown in FIGS. 5 and 6 designed for switching the high-voltage of the anode 44 between bias-voltages having values of V, (V+$\Delta V_1$) and (V−$\Delta V_2$), respectively.

The value of the resistor $R_{310}$ is selected to produce, together with resistors $R_C$ and $R_B$ a voltage divider that provides bias-voltage, at anode 44 when the switch 300 is in position 302, which is equal to (V). The value of the resistor $R_{308}$ is selected to produce, together with resistors $R_C$ and $R_B$ a voltage divider that provides bias-voltage, at anode 44 when switch $S_{300}$ is in position 304, which is equal to (V+$\Delta V_1$). Similarly, the value of resistor $R_{312}$ is selected to produce, together with resistors $R_C$ and $R_B$ a voltage divider that provides bias-voltage, at anode 44 when switch 300 is in position 306, which is equal to (V−$\Delta V_2$).

The resistors, $R_B$, $R_{308}$, $R_{310}$ and $R_{312}$ are in parallel to capacitors, $R_D$, $C_{308}$, $C_{310}$ and $R_{312}$, respectively, and thus, do not affect the charging time-constant of the above mentioned capacitors. The charging time constant of the capacitor $C_D$ depends only on the resistor $R_C$ and the capacitance of the capacitors $C_{308}$, $C_{310}$ and $C_{312}$, which are connected in series to capacitor $C_D$ in the switching positions 302, 304 and 307, respectively. Since the total capacitance of $C_D$ in series with another capacitor, such as capacitors $C_{308}$, $C_{310}$ or $C_{312}$ is smaller than the capacitance of capacitor $C_D$, thus the time constant $\tau$ for the charging capacitor $C_D$ may be written as:

$$\tau < R_C C_D$$

The charging time constant t for charging the capacitor $C_D$ is actually the time constant of changing the bias voltage on anode 44. $C_D$ is of the order of less than 1 pf and $R_C$ is of the order of less than 1 KΩ. Accordingly, the time constant for changing the bias voltage of anode 44 is given by:

$$\tau < 10^{-12}\cdot 10^3 = 10^{-9} = 1 \text{ ns}$$

Accordingly, the bias voltage of anode 44 can be changed at the desired rate.

The capacitor $C_{310}$ at the input of charge-sensitive preamplifier 114 may introduce extra noise to the measured signal when the switch 300 is in a measuring-position 301. To eliminate such noise, the switch 314 moves to an open position after the bias-voltage on anode 44 reaches a desired value. Controlling of the switches, such as the switch 300 and 314 may be performed by a control unit, such as control unit 200 of FIGS. 5 and 6.

Figure 9:
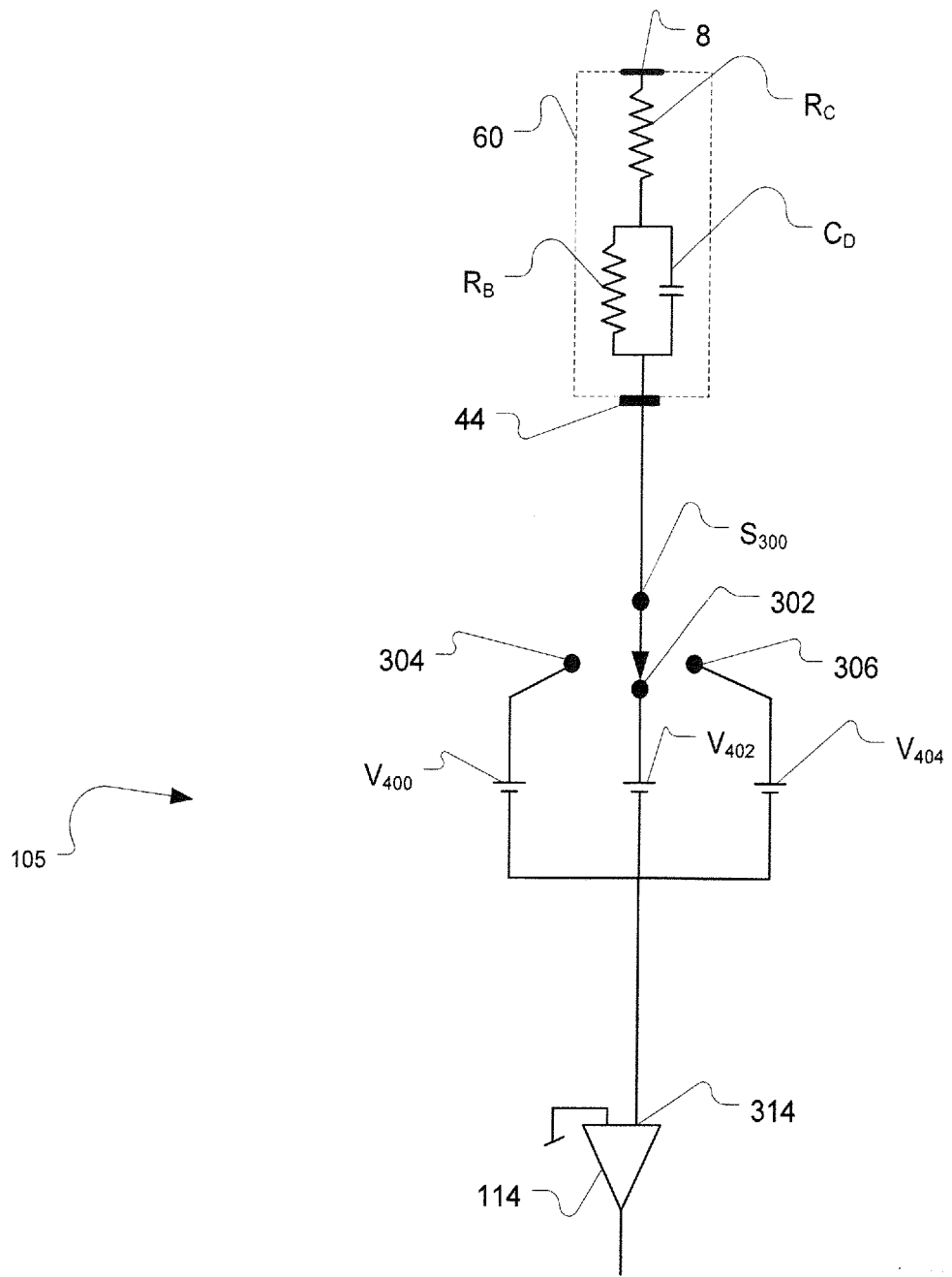
FIG. 9 is a schematic diagram of a portion of a detector illustrating a charge collection control arrangement in accordance with another embodiment.

FIG. 9 is another embodiment that is operable to allow fast changing of the bias on anodes, such as anodes 44, 46 and 48 of the detector 60 of FIGS. 4 and 5. In order to allow such fast change of the above mentioned bias, the time constant of control unit 105 should be shorter than the switching time of unit 105. In FIG. 8, fast change of the bias is achieved by the resistor-capacitor pairs ($R_{308}$, $C_{308}$), ($R_{310}$, $C_{310}$) and ($R_{312}$, $C_{312}$). The unit 105 of FIG. 9 is similar to the unit 103 of FIG.

8 with the exception that resistor-capacitor pairs ($R_{308}$, $C_{308}$), ($R_{310}$, $C_{310}$) and ($R_{312}$, $C_{312}$) of FIG. 8 have been replaced by voltage-sources 400, 402 and 404, respectively. Since any voltage-source has internal resistance close to zero, the voltage-sources 400, 402 and 404 ensure that control unit 105 has a very short time constant, which is shorter than the switching time of the unit 105. The voltage-sources 400, 402 and 404 provide bias voltage that is similar or equal to the voltage that is dropped on the resistor-capacitor pairs ($R_{308}$, $C_{308}$), ($R_{310}$, $C_{310}$) and ($R_{312}$, $C_{312}$) in the unit 103 of FIG. 8.

The various embodiments may be implemented, for example, using an application-specific integrated circuit (ASIC) technology. In some embodiments, the electronic channels, the high voltage switches and the control unit may be implemented with on-chip technology in the same ASIC or in several different ASICs.

For example, on-chip technology for high voltage switching in an ASIC may be provided as described below. In particular, as described above, for shifting the line-sharing by 200 μm, to provide complete charge collection in various embodiments, the bias voltage change of the pixels adjacent to the measured pixels is about 80V. Accordingly, in some embodiments, an ASIC capable of switching high voltages up to 500V at a slew rate of 11000V/μs, which is equivalent to switching time of 80V in 7.2 ns is used. Accordingly, various embodiments may be implemented on an ASIC. For example, one ASIC may be the SP600 or SP601 High Voltage Integrated Circuit (HVIC) MOSFET/IGT available from Fairchild Semiconductor. Another example is the NF series of IGBT modules available from Mitsubishi Electric Corporation. Thus, according to various embodiments, the switched voltage is about 50V and the switching time is about 10 ns (much less than the drift time of 500 ns).

Various embodiments may also be implemented in connection with a high speed digital ASIC, such as an ASIC with a clock cycle of 1-18 GHz that operates as the control unit. For example, the control unit in various embodiments provides high voltage switching in a time similar to the switching time, for example, 10 ns. One example is an Instantaneous Frequency Measurement Receiver (IFMs) or a Digital Frequency Discriminator (DFD) available from Spectrum Microwave.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A radiation detector comprising:
a semiconductor substrate;
at least one cathode on a surface of the semiconductor substrate;
a plurality of anodes on a surface of the semiconductor substrate opposite the at least one cathode, the plurality of anodes having gaps therebetween; and
a charge collection control arrangement configured to vary a voltage of at least one of a group of adjacent anodes in response to a detected shared charge between at least two of the adjacent anodes, to cause the detected shared charge to drift towards one anode of the at least two anodes, the detected shared charge induced within the semiconductor substrate by an incident photon.

2. The radiation detector of claim 1, wherein the charge collection control arrangement is configured to prevent surface recombination of one or more charges at the gaps between the anodes.

3. The radiation detector of claim 1, wherein the charge collection control arrangement is configured to shift a charge sharing line within the semiconductor substrate to shift a voxel position.

4. The radiation detector of claim 3, wherein the voxel position is shifted to include at least one of the anodes, wherein the detected shared charge is collected by the one anode of the at least two anodes.

5. The radiation detector of claim 4, wherein the shifted voxel maintains an area and volume thereof.

6. The radiation detector of claim 1, wherein the charge control arrangement comprises a plurality of switches and resistors forming a voltage divider to bias the plurality of anodes.

7. The radiation detector of claim 6, wherein the charge control arrangement comprises a plurality of comparators electrically coupled to the anodes and configured to identify electrical signals that exceed a threshold level.

8. The radiation detector of claim 7, wherein the charge control arrangement comprises a control unit to control the switching of the switches based on an output signal from the comparators.

9. The radiation detector of claim 8, wherein the control unit controls the switches to change an equivalent resistance produced by the resistors in one or more electronic channels of the anodes.

10. The radiation detector of claim 8, wherein the control unit controls the switches to bias all of the anodes except for two with a same bias voltage.

11. The radiation detector of claim 1, wherein the charge control arrangement is implemented in an application-specific integrated circuit (ASIC).

12. The radiation detector of claim 1, wherein the charge control arrangement is configured to change a relative voltage of at least two anodes immediately surrounding a center pixel to shift a charge sharing line within the semiconductor substrate, wherein a voltage of one of the at least two anodes is increased and a voltage of another of the at least two anodes is decreased.

13. The radiation detector of claim 12, wherein the charge sharing line is shifted about 200 µm.

14. The radiation detector of claim 1, wherein the charge control arrangement comprises a plurality of switches selectively connectable to a plurality of resistors and forming a voltage divider to bias the plurality of anodes, wherein the plurality of switches have three different switch positions to connect to different ones of the plurality of resistors that are connected in parallel with a corresponding resistor, the switching of the plurality of switches configured to account for a parasitic capacitance of the radiation detector.

15. The radiation detector of claim 1, wherein the charge control arrangement comprises a plurality of switches having a plurality of switch positions selectively connectable to a corresponding voltage source.

16. The radiation detector of claim 1, wherein the anodes of the group of adjacent anodes are biased to a common initial bias voltage before the voltage of the at least one of the group of adjacent anodes is varied.

17. A radiation detector comprising:
a semiconductor substrate;
at least one cathode on a surface of the semiconductor substrate;
a plurality of anodes on a surface of the semiconductor substrate opposite the at least one cathode, the plurality of anodes having gaps therebetween; and
a charge collection control arrangement having a plurality of switches and resistors forming a voltage divider to bias the plurality of anodes, and further comprising a control unit to control the switching of the switches to vary a voltage of at least one of a group of adjacent anodes in response to a detected shared charge between at least two of the adjacent anodes, to shift a charge sharing line within the semiconductor substrate to cause the detected share charge to drift towards one anode of the at least two of the adjacent anodes, the detected shared charge induced within the semiconductor substrate by an incident photon.

18. The radiation detector of claim 17, wherein the charge collection control arrangement is configured to prevent surface recombination of one or more charges at the gaps between the anodes.

19. The radiation detector of claim 17, wherein the charge control arrangement comprises a plurality of comparators electrically coupled to the anodes and configured to identify electrical signals that a exceed a threshold level, wherein the control unit is configured to control the switching of the switches based on an output signal from the comparators to change an equivalent resistance produced by the resistors in one or more electronic channels of the anodes.

20. The radiation detector of claim 19, wherein the control unit controls the switches to bias all of the anodes except for two with a same bias voltage.

21. The radiation detector of claim 17, wherein the charge control arrangement is implemented in an application-specific integrated circuit (ASIC).

22. The radiation detector of claim wherein the charge control arrangement is configured to change a relative voltage of anodes surrounding a center pixel to shift a charge sharing line within the semiconductor substrate about 200 µm.

23. A method for controlling charge collection in a pixelated radiation detector, the method comprising:
coupling a charge control arrangement to a pixelated radiation detector; and
controlling charge collection of the pixelated radiation detector with the charge control arrangement using a plurality of switches and resistors forming a voltage divider to bias a plurality of anodes of the pixelated radiation detector by controlling the switching of the switches to vary a voltage of at least one of a group of adjacent anodes in response to a detected shared charge between at least two of the adjacent anodes, to shift a charge sharing line within a semiconductor substrate of the pixelated radiation detector to cause the detected shared charge to drift towards one anode of the at least two of the adjacent anodes, the detected shared charge induced within the semiconductor substrate by an incident photon.

24. The method of claim 23, further comprising providing the charge control arrangement in an application-specific integrated circuit (ASIC).

\* \* \* \* \*